US005853273A

United States Patent [19]

Coffey

[11] Patent Number: 5,853,273

[45] Date of Patent: Dec. 29, 1998

[54] FIXED-BASE ROUTER WITH V-BLOCK MOUNTING

[75] Inventor: John R. Coffey, New Bern, N.C.

[73] Assignee: S-B Power Tool Company, Chicago, Ill.

[21] Appl. No.: 963,917

[22] Filed: Nov. 4, 1997

[51] Int. Cl.$^{6}$ .......... B23C 1/20

[52] U.S. Cl. .......... 409/182; 144/136.45; 144/371; 409/200

[58] Field of Search .......... 409/182, 181, 409/200, 204; 144/136.49, 154.5, 371

[56] References Cited

U.S. PATENT DOCUMENTS

| | | | |
|---|---|---|---|
| 4,319,860 | 3/1982 | Beares | 409/182 |
| 5,088,865 | 2/1992 | Beth et al. | 409/182 |
| 5,094,575 | 3/1992 | Keiser et al. | 409/182 |
| 5,101,875 | 4/1992 | Eckhold et al. | 409/182 |
| 5,181,813 | 1/1993 | McCracken | 409/182 |
| 5,188,492 | 2/1993 | McCracken | 409/182 |

*Primary Examiner*—Daniel W. Howell
*Assistant Examiner*—Adesh Bhargava
*Attorney, Agent, or Firm*—Jones, Day, Reavis & Pogue

[57] ABSTRACT

The fixed-base router includes a base assembly and a cylindrical motor housing. The base assembly has a cylindrical member which is hollow defining a vertically disposed inner cylindrical surface with two axially extending ribs. The cylindrical member has an axial slot between a pair of adjacent inner projections. Only the two ribs and the inner projections engage the cylindrical motor housing when the base cylinder is clamped to the cylindrical motor housing. The two ribs and the slot are substantially equally spaced from each other.

14 Claims, 4 Drawing Sheets

FIXED-BASE ROUTER WITH V-BLOCK MOUNTING

BACKGROUND OF THE INVENTION

The present invention relates to routers. More particularly, the present invention relates to improved construction for mounting the motor housing for repeatably precise and accurate concentric positioning relative to the base assembly at any vertical setting.

There are basically two types of routers: fixed-base and plunge. A fixed-base router, also known as a standard router, has a base that clamps directly to a removable motor housing making the router one integral or "fixed" unit.

Virtually all fixed-base routers have mechanisms to clamp the motor in the router's base at a designated vertical position. To effect the desired depth of cut (the amount of bit projecting through the sub-base), the operator must move the router motor up and down and then clamp the motor to the base at the desired vertical position. In most router applications it is necessary to set the depth of cut accurately and precisely. Further, it is necessary in almost all router applications to maintain the bit as precisely as possible in perpendicular relationship to the plane of the base and in concentric relationship to the outside diameter of the base in all vertical positions of the motor.

Router base assemblies typically include an annular base member which rests on the workpiece. The annular base supports an upright, hollow cylinder in concentric relationship therewith. The hollow cylinder has a vertical slot and is associated with a clamping mechanism for opening the base cylinder to receive the cylindrical motor housing freely and for closing or squeezing the cylindrical base cylinder into tight engagement with the cylindrical motor housing. The inside diameter of the base cylinder, in its open or relaxed state, is necessarily greater than the outside diameter of the cylindrical motor housing. When the clamping mechanism is actuated to squeeze the base cylinder into tight frictional engagement with the cylindrical motor housing, the base cylinder will no longer maintain a true circular cross-section. In most cases, the clamped, non-circular base assembly will engage the cylindrical motor housing at two, diametrically oppositely disposed, vertical areas of contact. Thus, the motor housing is subject to being canted or cocked slightly with respect to the base cylinder in which event the bit will not be in a precise perpendicular position with respect to the plane of the annular base member which rests on the workpiece. Accordingly, the resulting cutting operation may not be as precise as the operator would like.

SUMMARY AND OBJECTS OF THE PRESENT INVENTION

The present invention may be summarized as providing an improved mounting construction in the router base assembly for maintaining the bit in true perpendicular relationship with the plane of the annular base in all vertical positions of the router motor housing.

A primary object of the present invention is the provision of a cylindrical base member for a router having arcuately spaced, vertically extending support ribs for engaging a cylindrical motor housing.

It is another object of the present invention to provide a mounting construction of the type just referred to wherein the support ribs establish a V-block type of mounting between the cylindrical base member and the cylindrical motor housing.

Another object of the present invention is the provision of a router mounting construction of the type just referred to which is of uncomplicated construction thereby lending itself to low-cost manufacture and reliable operation.

These and other objects and advantages of the invention will become apparent from the following specification.

DESCRIPTION OF A PREFERRED EMBODIMENT

Figure 1:
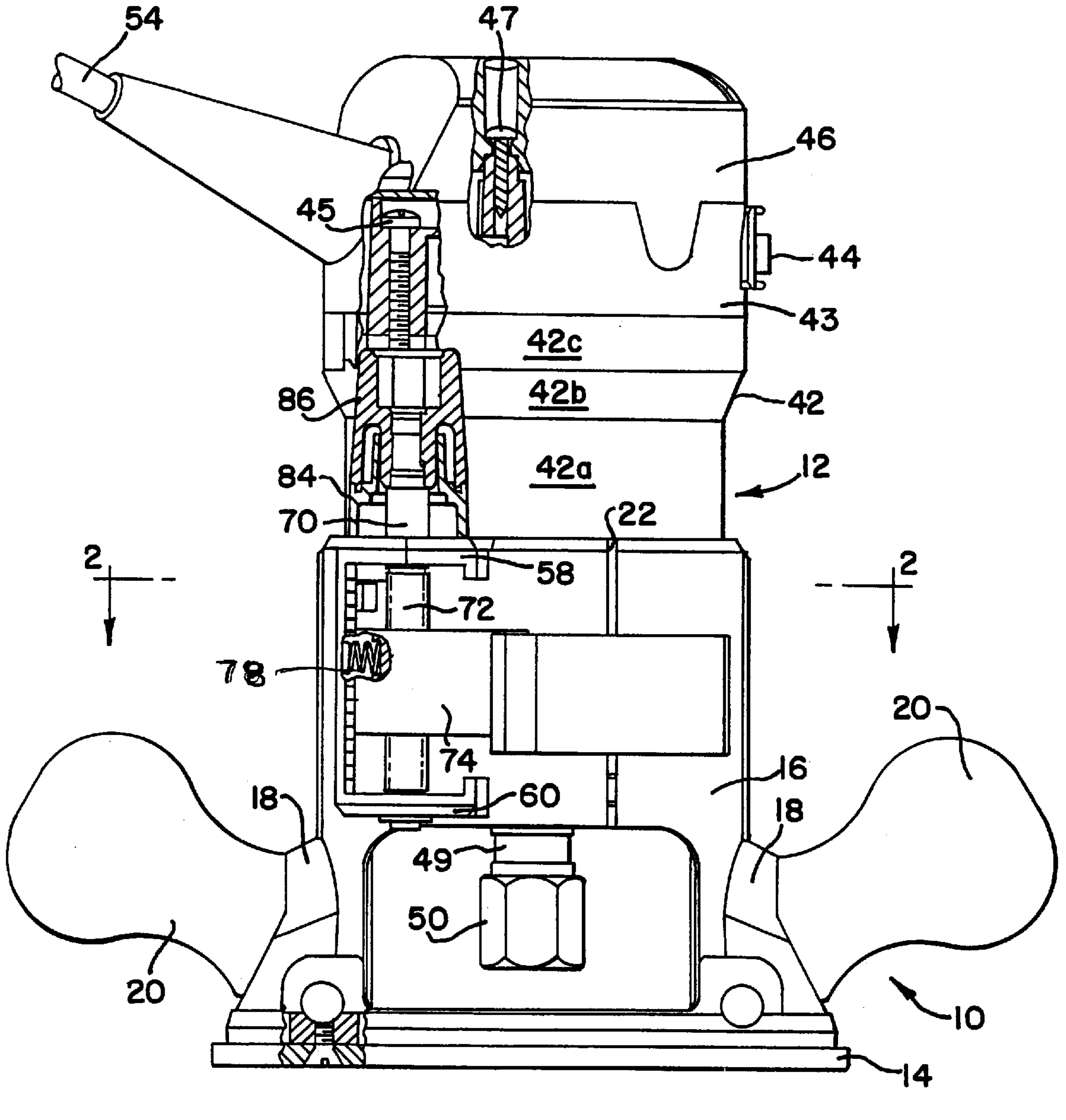
FIG. 1 is a front elevational view of a fixed-base router incorporating the present invention.
Figure 2:
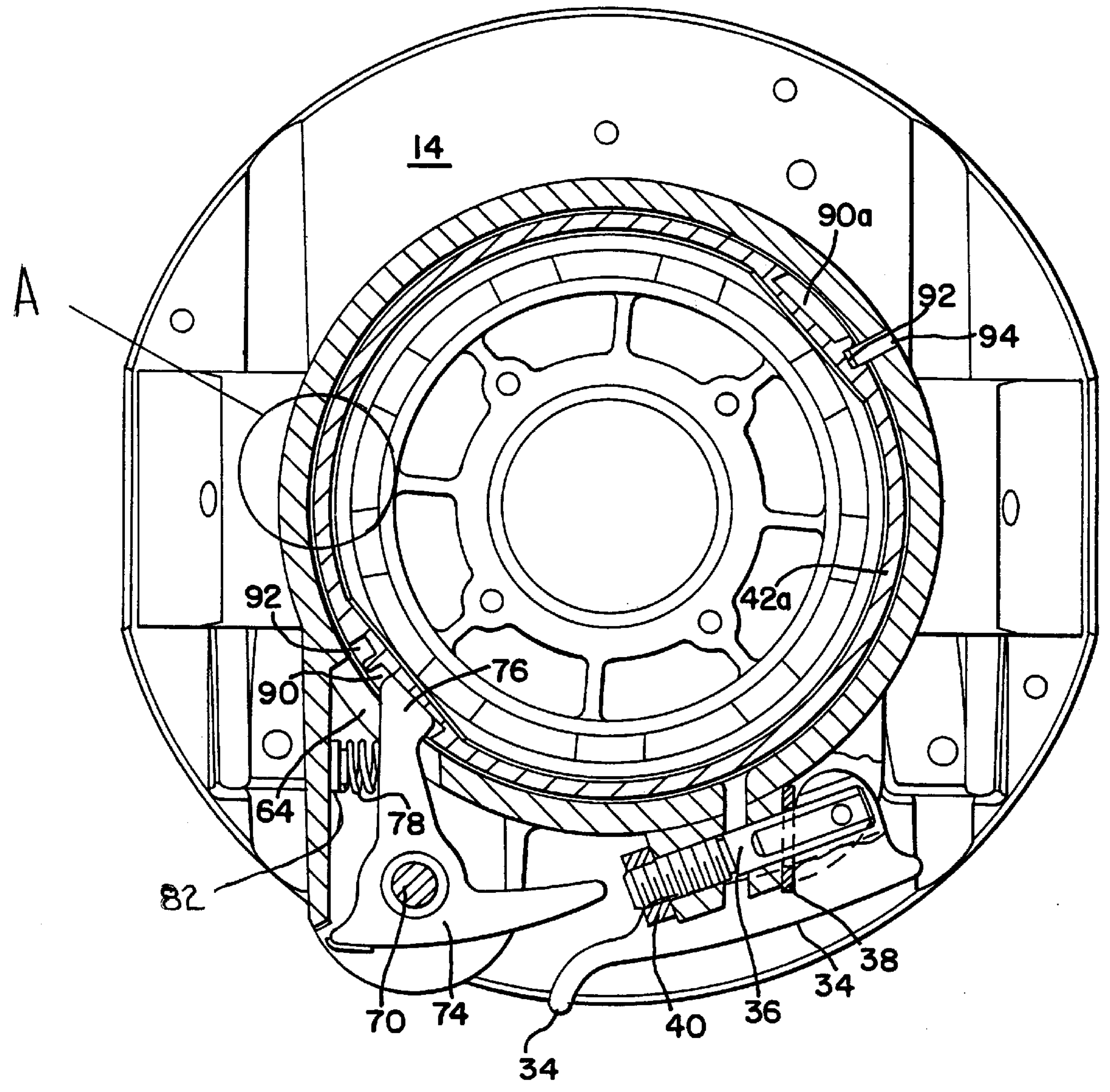
FIG. 2 is an enlarged section taken along the line 2—2 of FIG. 1.
Figure 4:
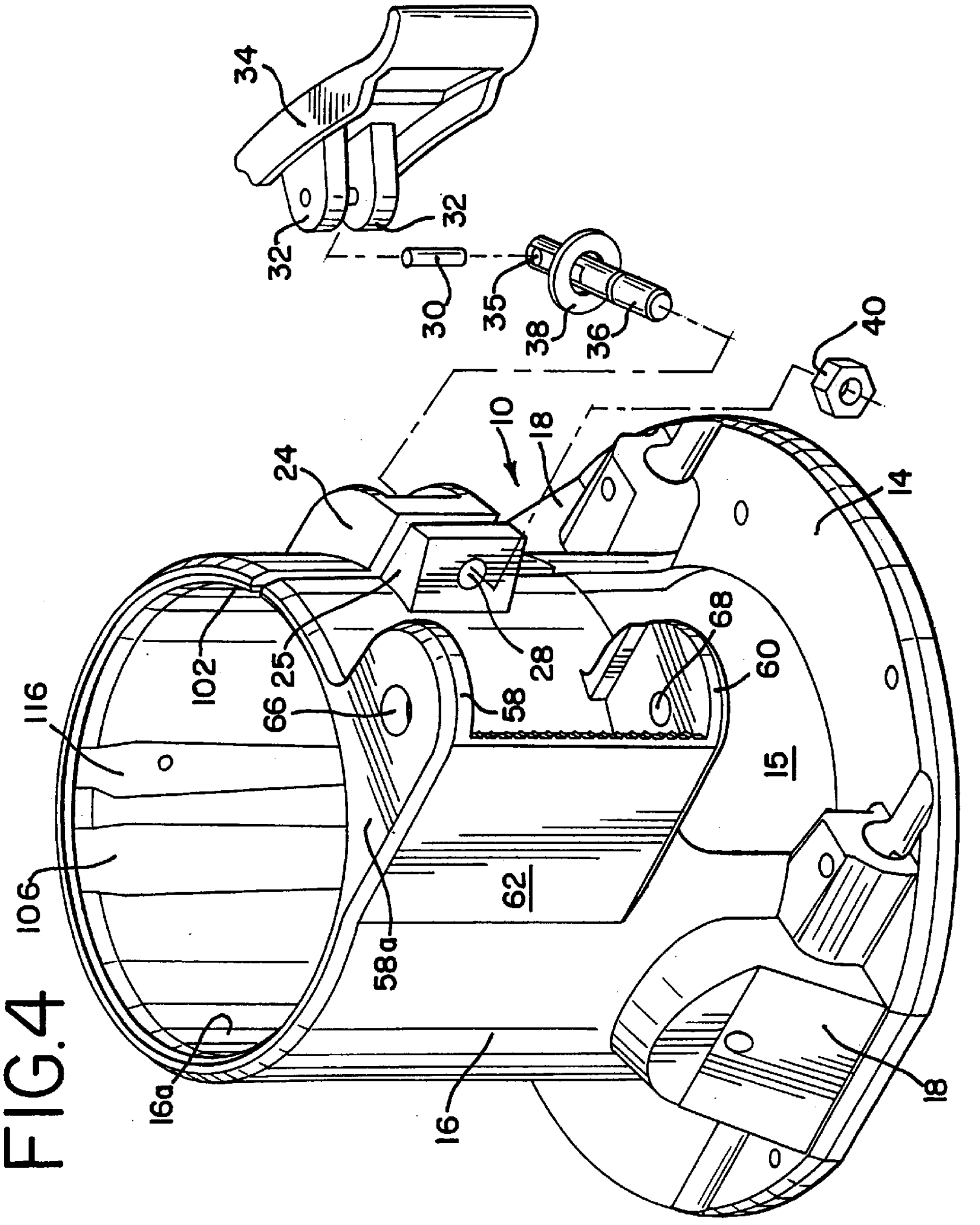
FIG. 4 is an enlarged exploded isometric of the base assembly.

Referring primarily to FIGS. 1 and 2, a router embodying the present invention includes a base assembly, generally designated 10, and a motor assembly, generally designated 12. The base assembly 10 includes a generally annular base member 14 having an opening 15 (FIG. 4). The base assembly includes a cylindrical base member 16 supported by the annular base member 14 in concentric relationship therewith. The cylindrical base member 16 includes diametrically disposed formations 18 supporting the usual handles 20 (the handles are shown only in FIG. 1).

Figure 3:
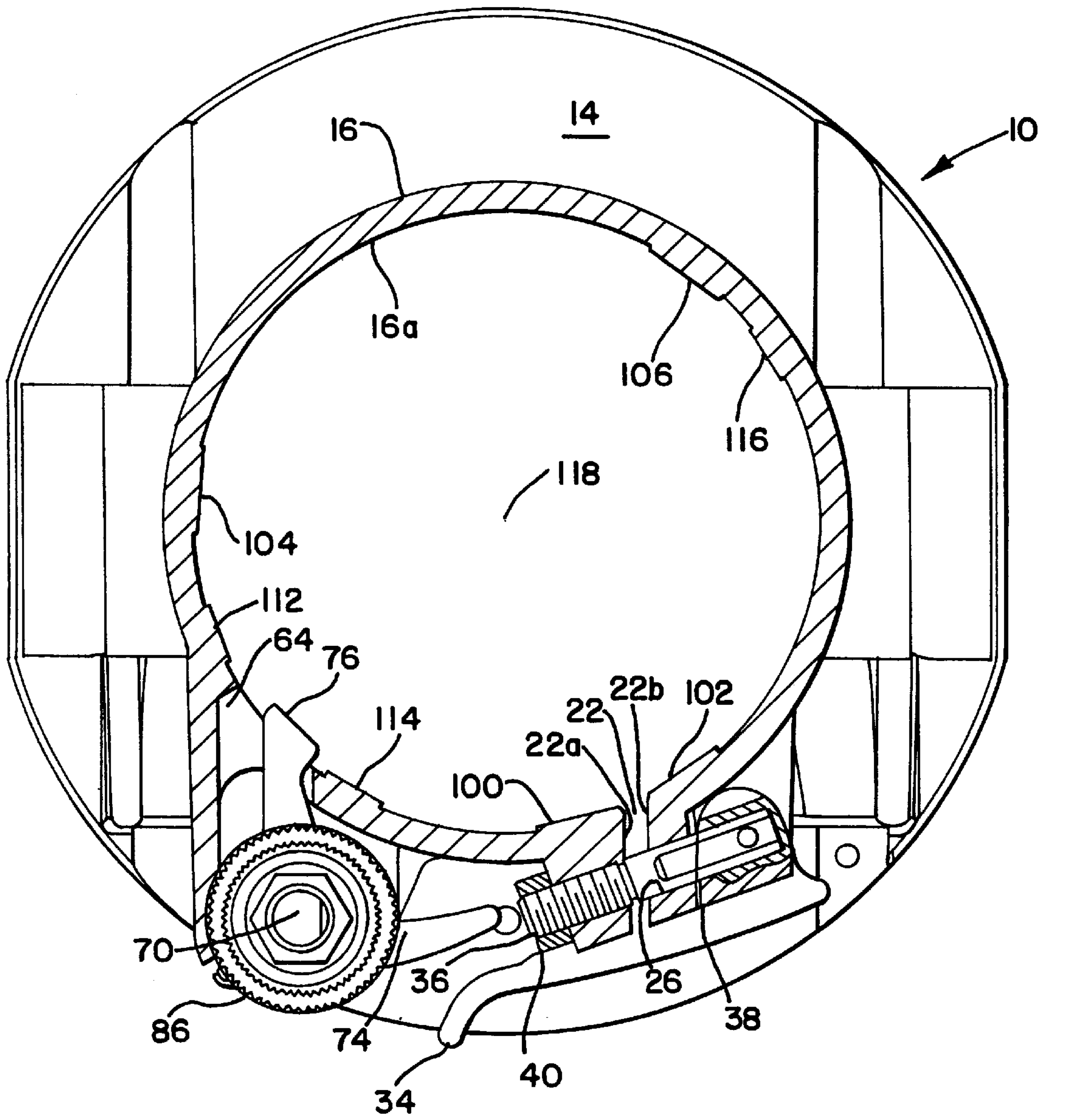
FIG. 3 is a reduced-in-size section similar to FIG. 2 but showing only the base assembly.

Referring particularly to FIG. 4, it is seen that the cylindrical base member 16 has an axial or longitudinally extending slot 22. Adjacent this slot, the cylindrical member 16 mounts clamp support members 24 and 25 having respective aligned bores 26 and 28. A pin 30 is captured between ears 32 integral with an over-center clamp lever 34. The pin 30 is received within an aperture 35 formed in one end of an adjusting screw 36. The screw 36 is adapted to receive a washer 38 and a nut 40. The adjusting screw 36 is received within the bores 26, 28 of the support members 24, 25 as seen in FIGS. 2 and 3. It is apparent that the clamp lever 34 may be actuated for squeezing the cylindrical base member 16 into snug engagement with the motor housing 42. Also, the lever 34 may be released to permit easy movement of the motor housing in the base assembly.

The motor assembly 12 includes a hollow motor housing 42 having a cylindrical portion 42*a* joining with a frusto-conical portion 42*b* which in turn joins with an enlarged, concentric annular formation 42*c*. The motor assembly 12 also includes a cylindrical part 43 mounting a rocker switch 44. The part 43 is connected to the part 42 by suitable fasteners (one such fastener is shown in FIG. 1 and designated 45). Also, the motor assembly 12 includes a cover 46. The cover is detachably connected to the part 43 by a plurality of fasteners (one such fastener is illustrated and designated 47). The motor housing 42 is adapted to receive an electric motor (not shown) having an output shaft 49 mounting a collet 50. It will be understood that the collet 50 is adapted to mount a suitable router bit (not shown) which projects through the opening 15 of the base member 14 for engagement with the work. The motor is preferably electric and includes the usual cord 54. The motor is actuated by the rocker switch 44. Other types of motors may be provided, such as a pneumatic motor.

The cylinder 16 of the base assembly 10 includes integral opposed lugs 58 and 60 joined by a wall 62 adjacent a rectangular aperture 64 (FIGS. 2 and 3) formed in the cylinder 16. Lugs 58 and 60 include respective, vertically aligned apertures 66 and 68 rotatably receiving opposite ends of a vertical adjustment rod 70. The rod 70 includes an external threaded formation 72 received within a threaded bore formed in an adjustment lever 74. The lever 74 includes an integral latch formation 76. A spring 78 has one end thereof received within a blind bore (FIG. 1) formed in the lever 74. The other end of the spring 78 engages a shoulder washer 82 (FIG. 2) which abuts the inside surface of the wall 62 thereby biasing the latch 76 to extend through the aperture 64.

The rod 70 mounts an indicator ring 84 and a knob 86. The knob 86 and indicator ring 84 are mounted to the rod 70 for rotation therewith. The indicator ring 84 and the upper surface 58*a* of the lug 58 may be provided with suitable indicia in the nature of a scale to indicate the rotary position of the rod 70. It will be apparent that rotation of the rod 70, by actuation of the knob 86, will cause vertical movement of the adjustment lever 74 upwardly or downwardly depending on the direction of rotation of the rod 70.

It will be understood that the cylindrical member 42*a* of the motor housing 42 includes three vertically aligned positioning notches. (One such notch 90 is shown in FIG. 2.) Each notch 90 is adapted to receive the latch 76 of the adjustment lever 74. Of course, any desired number of such vertically aligned notches or formations may be provided. The notches may be in the form of recesses in the cylinder 42*a* or in the form of openings through the cylinder 42*a*. Preferably, the cylinder 42*a* is provided with three additional vertically aligned notches diametrically oppositely disposed to the notches 90. One such notch 90*a* is shown in FIG. 2. Thus, the motor assembly 12 may be received within the base assembly in either of two rotary positions. As seen in FIG. 2, the cylinder 42*a* is provided with two diametrically oppositely disposed, external recesses 92 each adapted to receive an alignment pin 94 mounted in the base cylinder 16. Engagement of one of the recesses 92 with the pin 94 will ensure that the notches 90 or 90*a* are in rotary alignment with the latch 76.

To adjust the motor and motor housing to the desired vertical position, the operator will release the over-center clamp 34 and slide the motor assembly 12 vertically to position a selected notch 90 or 90*a* in horizontal alignment with the latch 76 of the adjustment lever 74. Release of the adjustment lever 74 will permit the spring 78 to force the latch 76 into the selected notch 90 or 90*a*. Engagement of the latch 76 with one of the selected notches provides a coarse vertical adjustment.

After the latch 76 has been engaged with the selected notch 90 or 90*a*, the operator will rotate the knob 86 in one direction or the other to rotate the rod 70 and thus move the adjustment lever 74 vertically upwardly or downwardly depending on the direction of rotation of the rod 70. This movement of the adjustment lever will cause corresponding movement of the motor assembly 12 for establishing fine vertical adjustment of the motor and motor housing. The vertical adjustment mechanism is disclosed and claimed in application Ser. No. 08/963,918, filed Nov. 4, 1997, Attorney Docket No. 950801, and assigned to the assignee of the present application. The disclosure of that application is incorporated herein by reference. After the desired vertical position has been achieved by operation of the knob 86, the clamp 34 will be actuated to secure the motor assembly 12 to the base assembly 10.

As seen in FIG. 3, the slot 22 defines spaced, axially extending faces 22*a* and 22*b*. The clamping mechanism is shown in its clamped position in both FIGS. 2 and 3. In the clamped position, the faces 22*a* and 22*b* will be spaced apart a distance determined by the position of the nut 40 on the screw 36. The nut 40 provides a means to adjust the frictional engagement between the cylindrical base member 16 and the cylindrical motor housing 42. When the clamping lever 34 is moved to the unclamped position, cylinder 16 will expand to its relaxed circular state whereupon the faces 22*a* and 22*b* will be spaced from each other at a distance greater than the distance between these two faces when in the clamped position shown in FIGS. 2 and 3. The inside diameter of the cylinder 16 when in its relaxed or unclamped configuration is slightly greater than the outside diameter of the cylindrical motor housing 42.

As best seen in FIG. 3, the cylinder 16 includes an axially extending support rib adjacent the face 22*a* defining planar support surface 100. Cylinder 16 also includes an axially extending rib adjacent the face 22*b* defining a further planar support surface 102. Cylinder 16 includes a third rib defining a further flat support surface 104. A fourth planar support surface 106 is defined by an inwardly extending rib formed in the cylinder 16. The support surfaces 104 and 106 are spaced at approximately 120° from each other. The slot 22 is substantially equidistant from the support surfaces 104 and 106 and thus the two surfaces 100 and 102 are approximately equidistant from the surfaces 104 and 106.

Figure 5:
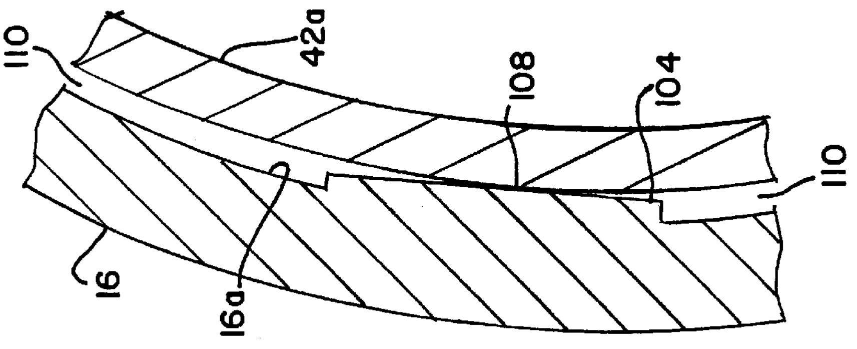
FIG. 5 is an enlarged view of detail "A" of FIG. 2.

When the motor housing 42 is received within the cylinder 16 and when the clamping mechanism is moved to its clamped position, the planar surfaces 100, 102, 104 and 106 will engage the exterior surface of the cylindrical motor portion 42*a*. Flat surfaces 100, 102, 104 and 106 establish tangential contact with the cylindrical motor part 42*a*. In this respect, attention is invited to FIG. 5 showing the cylindrical motor member 42*a* in engagement with the planar surface 104 when the clamping lever 34 is in its clamped position. The tangential contact between the cylinder 42*a* and the flat support surface 104 establishes an axially extending area of contact 108. The only areas of contact between the cylinder 16 of the base assembly and the cylindrical motor member 42*a* when in the clamped position will be those established by the four planar support surfaces 100, 102, 104 and 106. The axially extending support ribs all define arcuate open spaces 110 between the inner surface 16*a* of the cylinder 16 and the exterior surface of the motor housing cylinder 42*a*.

The support surfaces 104 and 106 establish a "V" formation thus constituting a V-block form of mounting for the cylindrical motor housing. The support surfaces 100 and 102 serve only to press and secure the cylinder 42*a* of the motor housing 12 against the "V" formed by support surfaces 104 and 106. This mounting assures that the motor housing will not become cocked or canted when it is being clamped in the base assembly as it could be if the internal surface 16*a* were only cylindrical, i.e., if the cylindrical surface 16*a* did not include the various planar support surfaces. Accordingly, the router bit will be maintained in a precise perpendicular position to the plane of the annular base member 14 in all vertical positions of the motor assembly. Further, concentricity of the collet 50 will be maintained in all vertical positions of the motor assembly 12 because the motor is prevented from rotating within the base during vertical positioning by reason of the engagement of the pin 94 with one of the slots 92. If it were necessary to rotate the motor housing to achieve vertical adjustment, as is the case with many prior art designs, any eccentricity of the collet with respect to the motor housing would introduce errors upon rotation of the motor housing.

It will be noted in FIG. 3 that the cylinder 16 includes additional inwardly extending ribs forming further planar support surfaces 112, 114 and 116. These support surfaces do not contact the exterior surface of the motor housing 42 when the clamping mechanism is in its clamped position. This is so because the distance of each of the flat surfaces 112, 114 and 116 from the longitudinal central axis 118 of the cylinder 16 is greater than the distance of each of the flat surfaces 100, 102, 104 and 106 from the axis 118. The additional support surfaces are provided to support the motor housing when the clamping mechanism is in its unclamped position. In this regard, when the lever 34 is swung to its unclamped position (counterclockwise as shown in FIGS. 2 and 3), the motor housing will be restrained from vertical movement only by engagement of the latch 76 in one of the notches 90 or 90*a*. Thus, in the unclamped position, the motor housing tends to cant or cock. Engagement between the cylinder 42*a* and one or more of the support surfaces 100, 102, 104, 106, 112, 114 and 116 tends to minimize the amount of canting of the motor housing when the clamping mechanism is in its unclamped position.

While a preferred embodiment of the invention has been illustrated and described, the invention is not to be limited to the preferred embodiment. The invention is susceptible to various changes and modifications coming within the scope of the following claims.

We claim:

1. A fixed-base router comprising:

(a) a base assembly including a first annular base member mounting a second vertically disposed base member, said second base member including two, horizontally spaced, vertically extending support ribs and at least one clamping surface substantially equally spaced from each of said support ribs; and (b) a motor housing having a vertically disposed, cylindrical exterior surface, said motor housing being mounted by said base assembly with said support ribs and said clamping surface in engagement with said exterior surface, said support ribs and said clamping surface establishing the only areas of supporting engagement between the base assembly and said motor housing.

2. The fixed-base router according to claim 1 wherein each of said support ribs and said clamping surface are substantially equally spaced from each other.

3. The fixed-base router according to claim 1 wherein said support ribs are defined by planar surfaces in tangential engagement with said cylindrical exterior surface.

4. A fixed-base router according to claim 3 wherein said clamping surface is defined by at least one planar surface in tangential engagement with said cylindrical exterior surface.

5. A fixed-base router comprising:

(a) a base assembly including an annular base member mounting a cylindrical base member in substantial concentric relationship therewith, said cylindrical base member being hollow and defining a vertically disposed, cylindrical inner surface, said cylindrical base member having an axially extending through slot defining opposed faces spaced at a predetermined distance when the cylindrical base member is in a relaxed state thereby establishing a first diameter of the cylindrical inner surface;

(b) a motor housing including a cylindrical outer surface having an outside diameter less than said first diameter of said cylindrical inner surface, said cylindrical housing being telescopingly and slidably received within said cylindrical base member for vertical movement relative thereto;

(c) clamping means mounted on said base assembly and being movable back and forth between an unclamped position wherein said opposed faces are spaced at said predetermined distance and a clamped position wherein said opposed faces are spaced at a distance less than said predetermined distance; and (d) said inner surface of the base member including at least two arcuately spaced, inwardly disposed, vertically extending support ribs in engagement with said cylindrical outer surface at axially extending areas of the cylindrical housing, said cylindrical base member including support means establishing an additional axial area of engagement with the cylindrical housing, said at least two ribs and said support means defining open arcuate spaces between the cylindrical inner surface and the cylindrical outer surface and establishing the sole areas of supporting engagement between the cylindrical base member and the cylindrical housing when the clamping means is in its clamped position.

6. The router according to claim 5 wherein each of said at least two support ribs and said support means are substantially equally spaced from each other.

7. The router according to claim 5 wherein said cylindrical inner surface of said cylindrical base member includes a pair of parallel, axially extending inner projections, said inner projections defining said support means.

8. The router according to claim 7 wherein each of said at least two support ribs and said support means are substantially equally spaced from each other.

9. The router according to claim 7 wherein said clamping means includes an over-center clamping mechanism.

10. The router according to claim 5 wherein said support ribs include respective planar surfaces in tangential engagement with said cylindrical housing.

11. The router according to claim 7 wherein said support ribs include respective planar surfaces in tangential engagement with said cylindrical housing.

12. The router according to claim 7 wherein each of said at least two support ribs and said support means are substantially equally spaced from each other.

13. The router according to claim 10 wherein each of said at least two support ribs and said support means are substantially equally spaced from each other.

14. The router of claim 7 wherein said slot is disposed between said inner projections in adjacent relationship therewith.

* * * * *